United States Patent [19]

Fisher et al.

[11] Patent Number: 5,701,670

[45] Date of Patent: Dec. 30, 1997

[54] METHOD OF MAKING ROCKET ENGINE COMBUSTION CHAMBER UTILIZING "SLIDE IN" PORT LINER

[75] Inventors: Steven C. Fisher; Theodore C. Adams, both of Simi; Maynard L. Stangeland, Thousand Oaks; Jacob Rietdyk, Alta Loma; Paul R. Winans, Thousand Oaks, all of Calif.

[73] Assignee: Boeing North American, Inc., Seal Beach, Calif.

[21] Appl. No.: 264,263

[22] Filed: Jun. 23, 1994

[51] Int. Cl.⁶ .................................................. B23P 15/00
[52] U.S. Cl. .................................. 29/890.01; 29/428
[58] Field of Search ................... 29/890.01, 428; 60/267, 752

[56] References Cited

U.S. PATENT DOCUMENTS

| | | | |
|---|---|---|---|
| 5,226,598 | 7/1993 | Woehrl | 29/890.01 |
| 5,386,628 | 2/1995 | Hartman et al. | 29/890.01 |
| 5,501,011 | 3/1996 | Pellet | 29/890.01 |

*Primary Examiner*—Irene Cuda
*Attorney, Agent, or Firm*—Steven E. Kahm; Harry B. Field

[57] ABSTRACT

A method of fabricating a rocket engine combustion chamber comprising assembling a liner having cooling channels, a plurality of throat support sections, and a structural jacket having inlet and outlet manifolds. Then heating the assembly in a pressurized furnace to bond the assembled parts to each other.

9 Claims, 4 Drawing Sheets

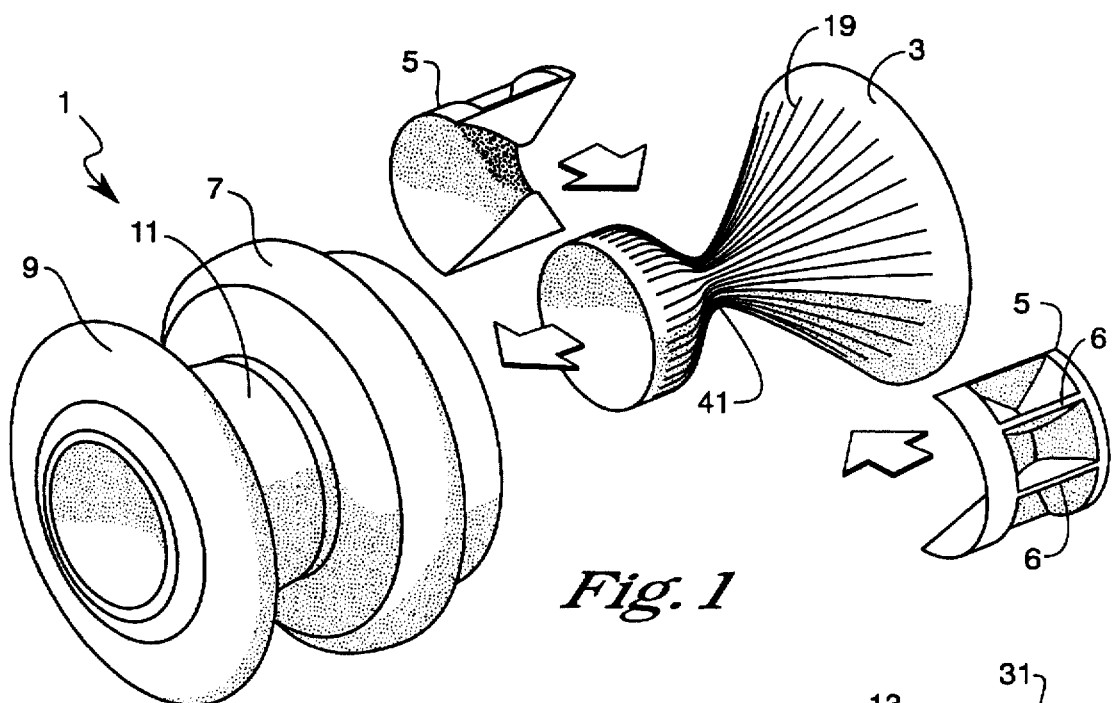
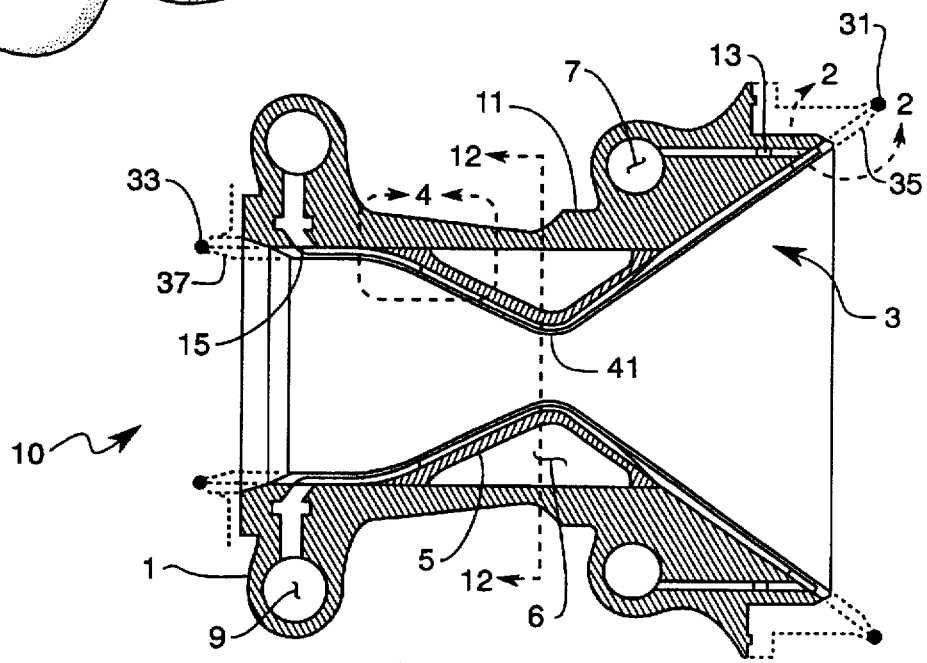
Fig. 1
Fig. 2

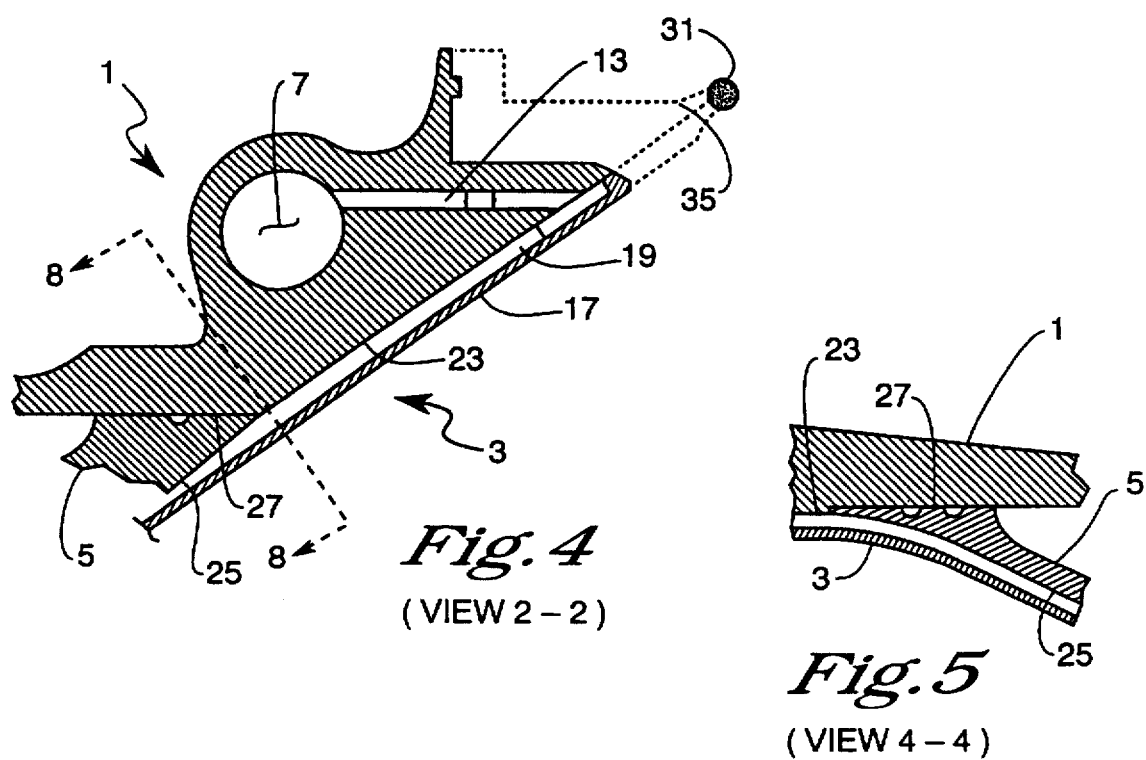
Fig. 4
(VIEW 2–2)
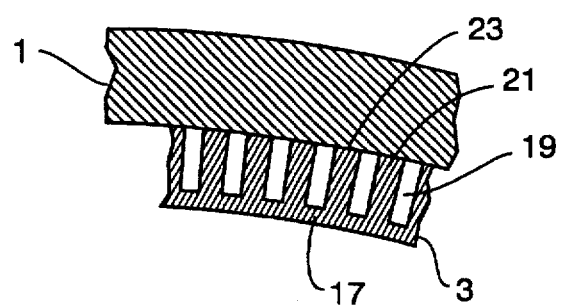
Fig. 5
(VIEW 4–4)
Fig. 6
(VIEW 8–8)

(VIEW 12-12)

METHOD OF MAKING ROCKET ENGINE COMBUSTION CHAMBER UTILIZING "SLIDE IN" PORT LINER

BACKGROUND OF THE INVENTION

1. Field of the Invention

This invention relates to rocket engine combustion chambers and more particularly to the method of assembling a structural jacket and a coolant liner.

2. Description of the Related Art

The function of a rocket engine main combustion chamber is to contain the combustion process (typically at 5000° to 6000° F. at 1000 to 4000 pounds per square inch pressure) and then accelerate the combustion products to a high velocity and exhaust them to create thrust. Typically, the combustion process takes place subsonically in the combustion chamber. The subsonic combustion gases are then accelerated through a converging/diverging DeLaval-type nozzle/venturi.

The combustion chamber typically consists of a monocoque structure to contain the combustion pressure, a cooled liner to protect the pressure vessel from the hot combustion gases, and manifolding required to circulate the coolant. Because of its inherent hourglass shape, combustion chambers are typically fabricated by starting with the coolant liner and building the pressure vessel jacket and manifolding around its external hourglass contour or starting with the pressure vessel and manifolding structure and building the coolant liner inside its internal hourglass contour. Materials of construction typically consist of copper base alloys for the coolant liner because of their high thermal conductivity and nickel-base alloys for the pressure vessel jacket and manifolds because of their high specific strength.

Currently, there are several methods of making combustion chambers with coolant channels. All of the methods in use today involve many fabrication steps each of which require critical inspections and possible rework if flawed. These processes are time consuming and expensive.

In one method, a coolant liner is machined from a billet of material. Coolant passage slots are machined on the outside of the liner. The coolant passages are then closed out using a plating process. The plating process is very labor-intensive, requiring several critical operations and is fraught with problems which can cause a considerable amount of rework in a typical chamber.

During the channel closeout process, the liner slots are filled with a wax material. The outer exposed surface is then burnished with a silver powder which forms a conductive plateable surface. On that surface, a layer of copper is electroplated, which is then followed by a build up of nickel to form a structural closeout to contain the coolant pressure. The nickel close out requires several plating cycles and several intermediate machining steps. All of the plating operations are plagued by problems such as contamination, plating solution chemistry, and other process parameters that can lead to poor bonding of the plated material. If anything goes wrong during this process, the plated material on the liner has to be machined back and the plating process repeated. Using this technique requires considerable time and labor to close out a liner.

Following the plating operations, the wax material must then be removed from the liner. This is a critical process, since any residual wax material can lead to contamination problems in subsequent operations.

When the liner is completed, the next step is to weld the inlet and outlet coolant manifolds to the liner structure. Local areas on the liner need to be built up with a considerable amount of electrodeposited nickel and machined backed to form a surface that can accommodate the weld joints. The manifolds are then welded onto the closed-out liner. Then the structural jacket, which is made up of several pieces, is assembled around the outside of the liner and manifold subassembly and welded in place. All of the weld joints are critical and require inspections. Any flaws found must be reworked. A typical combustion chamber may require as many as 100 critical welds. The process is very costly and time consuming. Utilizing this process, a complete main combustion chamber can take three (3) years to fabricate.

Another main combustion chamber fabrication method utilizes a "platelet" liner concept. In this method, the liner itself is made up of a stack of 15 to 20 very thin plates which are photochemically etched to form coolant slots, individually plated, stacked together, and then bonded to form a panel section of the liner with closed-out coolant passages. Any one of the plating processes or the bonding processes can form a bad joint, which would be reason to scrap the part. Typically seven or more individual panels are required to form an hourglass-shaped liner. The individual panels are installed inside the structural jacket. Since a joint is required between each of the adjacent panels, there are several locations for potential hot-gas leakage between the panels. All the joints must be sealed along the entire length of the combustion chamber. Also, all of the panels once installed, have to be bonded to the outer structural jacket. In order to bond the panels to the outer structural jacket, pressure bags are fabricated to match the contour of the thrust chamber. The bags are installed inside the thrust chamber liner along with backup tooling to support the pressure bags. The chamber and tooling are placed into a brazing furnace and brought up to temperature while the pressure is maintained in the pressure bags, which forces the liner into intimate contact with the jacket. If all goes well, a bond joint is created between the closed-out liner and the structural jacket. Pressure bags have not been 100% reliable since they can burst or leak, and it is very difficult to fabricate and maintain the correct geometry of a thin conformable pressure bag that will match the complex geometry of the combustion chamber liner and still contain the pressure required at bonding temperature.

SUMMARY OF THE INVENTION

The invention utilizes three basic components to form a combustion chamber for high-performance rocket engines: (1) a structural jacket, (2) a single-piece coolant liner, and (3) a plurality of throat support sections. The combustion chamber fabrication is described in the following steps. A liner is machined which has coolant channels formed in the outer surface. Throat support sections are fabricated and assembled around the indentation created by the venturi shape of the combustion chamber liner. The throat supports and the liner are then slid into the structural jacket. A welded or brazed seal joint between the liner and the structural jacket is made at the both forward and the aft end of the chamber. Any access ports to the coolant manifold system are closed off for the bond cycle. The coolant passages and voids between the throat support sections and the structural jacket are thus sealed off from the outside environment. The entire assembly is then placed into a furnace. The furnace is pressured and then brought up to bonding temperature. To aid in the bonding process, a vacuum may be drawn on the coolant passages and the void in the throat support area. At temperature, with the pressure applied to the entire outer surface of the jacket as well as the liner, the liner is forced to conform to the structural jacket, putting the liner into intimate contact with the jacket. At pressure and temperature, with intimate contact between the two parts, a bond joint is created between the liner and the structural jacket. Bond joints are also formed between the liner and the throat support sections, between the throat support sections themselves, and between the throat supports and the structural jacket. All of the bonding is done in one step in the pressurized furnace without requiring special tooling to force the parts into intimate contact. This method of fabrication closes out the coolant liner channels without having to utilize complicated wax filling, silver burnishing, electroplating, and machining process steps which have caused considerable problems in the past. Once the bonding is complete, the seal joint at the forward and aft end of the chamber is no longer required and may be removed from the assembly. The applicants' method eliminates all welds from the finished part. The invention is an improvement over past processes because there are no welds, there is no structural plating, and the critical liner is completely fabricated from a single piece of metal thus eliminating any joints required to form coolant channels. Further, there are no joints to be sealed longitudinally or anywhere else in the hot gas wall of the liner. The invention uses an integral liner that was machined from a single piece, which forms a barrier to isolate the hot gas from the structural jacket and preclude the coolant from leaking out into the hot gas causing a lack of coolant for the structural jacket.

One of the benefits of this fabrication method is the ability to maintain intimate contact between the liner and jacket without complicated and expensive pressure bags and structural backup tooling. Pressure bags are prone to leaks and require skilled labor to fabricate. In order for the pressure bags to withstand the high bonding loads at the high temperatures required for bonding, complicated, heavy, and expensive structural backup tooling must be used. The proposed method utilizes the liner as its own pressure bag and conforms perfectly to the outer structural jacket without any additional tooling. This represents a major simplification of the bonding process and also ensures a perfect fit between the liner and the jacket resulting in a perfect bond joint.

OBJECTS OF THE INVENTION

An object of the invention is to have a one-piece liner which is void of any joints or other material imperfections that can cause potential failure of the entire combustion chamber assembly.

Another object of the invention is to have a single bonding process which eliminates numerous weld joints and numerous structural plating processes.

It is an object of the invention to have a simple assembly process of inserting the liner into the structural jacket manifold and bonding them with a one step process.

It is a further object of the invention to make a combustion chamber by utilizing a one-piece liner fabricated from multiple pieces.

It is a further object of the invention to make a combustion chamber by utilizing a a one piece jacket manifold structure fabricated from multiple pieces.

It is a further object to utilize the one piece liner and one piece manifold jacket structure to act as pressure bags for applying force during the bonding process.

It is still another object of the invention to increase the heat transfer capability of the liner allowing the chamber to be used at higher pressures and higher temperatures and to have a longer life.

Another object of the invention is to provide ease of access to the back side of the liner which allows easy machining of the coolant passages prior to bond assembly.

Another object of the invention is to reduce the overall fabrication time, reduce the cost, and increase the quality of combustion chamber assembly.

Other objects, advantages, and novel features of the present invention will become apparent from the following detailed description of the invention when considered in conjunction with the accompanying drawings.

BRIEF DESCRIPTION OF THE DRAWINGS

FIG. 1 is an overall expanded view of the thrust chamber assembly showing the three major components prior to assembly.

FIG. 2 is a cross section of the thrust chamber assembly.

FIG. 4 is a cross section of the aft portion of the thrust chamber as taken from area 2—2 on FIG. 2.

FIG. 5 is a section near the forward end of the throat support of the thrust chamber as taken from area 4—4 on FIG. 2.

FIG. 6 is a cross section taken on line 8—8 of FIG. 4 through the coolant liner and structural jacket.

DETAILED DESCRIPTION OF THE PREFERRED EMBODIMENT

Figure 3:
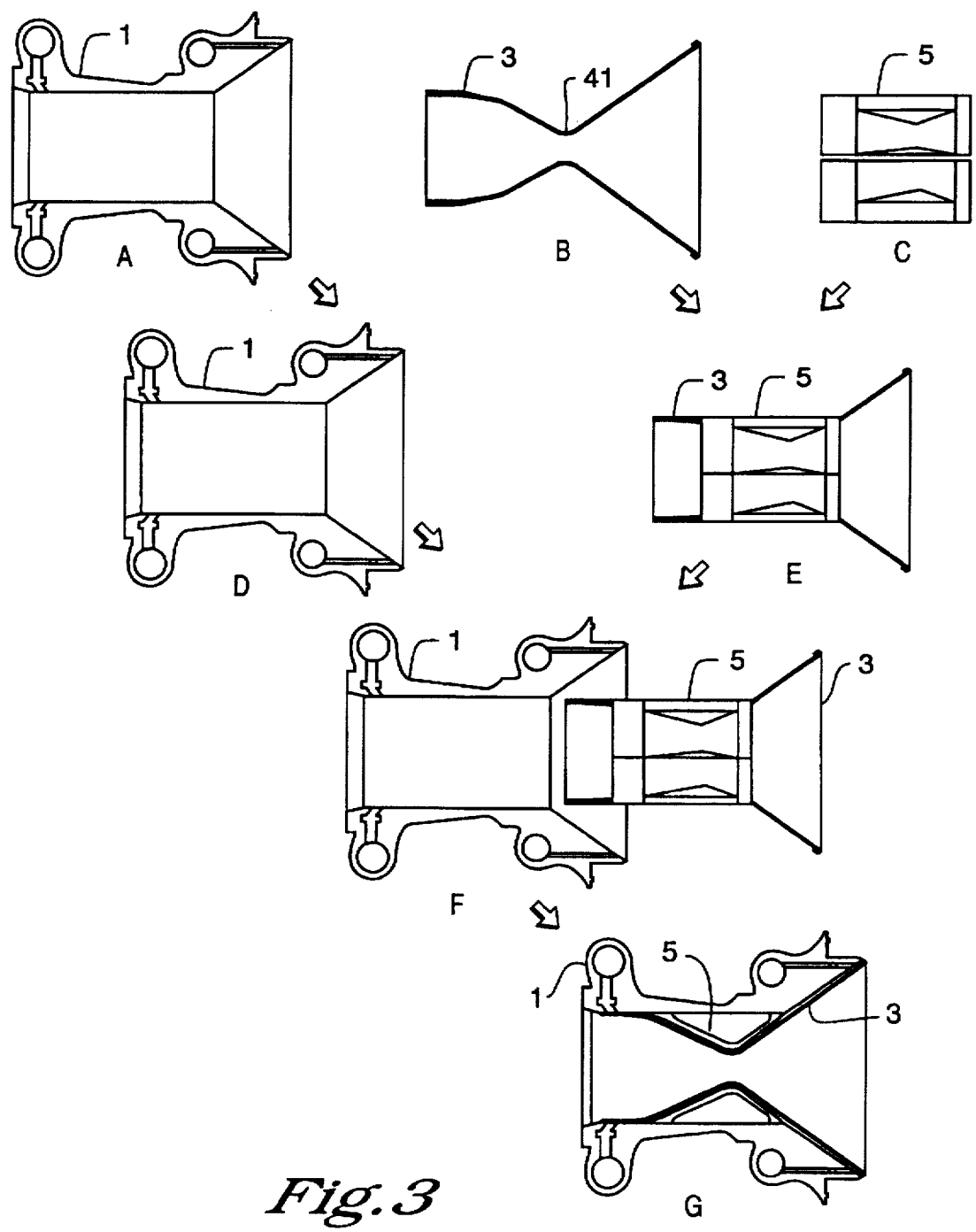
FIG. 3 shows the assembly steps of the combustion chamber.

FIG. 1 shows coolant liner 3 in which coolant channels 19 are formed. These coolant channels 19 are machined from the outside and are not closed out prior to assembly. The closeout of liner 3 is formed by bonding it to the structural jacket 1 and the throat supports sections 5. The overall assembly process is depicted by the arrows. It shows that the throat support sections 5 are assembled around the indentation forming the throat 41 in the coolant liner 3. Then, the assembled coolant liner 3 and throat support sections 5 are slid into the structural jacket 1. The structural jacket 1, contains the inlet manifold 7, the outlet manifold 9 and a cylindrical portion 11.

FIG. 2 shows the overall assembly of the combustion chamber 10 in cross section. The function of the combustion chamber itself is to contain a combustion process. The combustion process creates high pressure and temperature gases. The hot gases accelerate to sonic velocity through the throat 41 and then continue to accelerate supersonically downstream of the throat to create thrust. The structural jacket 1 restrains the pressure, however, the heat generated by the combustion process would melt the structural jacket without a cooling system. Therefore, the coolant liner 3 is required to keep the structural jacket cool and within its structural margins. Coolant enters the combustion chamber through the inlet manifold 7. It then travels through the coolant inlet feed passages 13 and flows into the coolant channels 19 in the coolant liner 3. The coolant passes through coolant liner 3 at high velocity which cools the hot gas wall 17 (FIG. 4) and isolates the heat of the combustion process from the structural jacket 1 keeping it cool. The coolant then exits through the outlet feed passages 15 and exit manifold 9. The throat support 5 forms the venturi shaped portion of the throat 41 of the combustion chamber.

FIG. 2 reveals the seal joints 31 and 33, which are used during the bonding process. Once the unit is completely bonded, the excess seal joint material 35 and 37 may be removed from the overall combustion chamber as will be discussed further below.

FIG. 3 shows the assembly process for the combustion chamber. The main components, the structural jacket 1, the coolant liner 3, and the throat support sections 5 are fabricated by conventional means. Note that there are three parallel paths of fabrication for the three major components of the chamber. The outer structural jacket 1 is fabricated (FIG. 3A) simultaneously with the coolant liner 3 (FIG. 3B) and the throat support sections 5 (FIG. 3C). This reduces the overall fabrication time considerably, as compared to a series fabrication process.

The structural jacket 1 may be fabricated utilizing a casting process to form the outer structural shell and the inlet and outlet manifolding details. By utilizing a one-piece casting, this complex structure can be created at a low cost without any welds. In an alternate embodiment the one piece jacket manifold structure can be fabricated from a plurality of sections before assembly with the liner.

The coolant liner 3 can be fabricated from a single piece of suitable alloy with the coolant channels 19 formed on the outside surface with easy access. In an alternate embodiment the one piece liner can also be fabricated from a plurality of sections before assembly with the jacket.

The throat support sections 5 may also be fabricated utilizing a casting process to create a low-cost part free of weld joints.

The three major components are then assembled. In preparation for the final bonding process, the bond surface of the detail parts are coated with alloys that will form bond joints at temperature. In addition, thin sheets of braze alloy may also be applied to any of the surfaces to aid in the bonding process. For example, gold may be plated on a copper alloy liner 3 and nickel plated on a stainless steel structural jacket 1 and throat support 5. At elevated temperatures (approximately 1700° F.), the combination of nickel, copper, and gold will form an alloy that will bond all of the components together.

Figure 7:
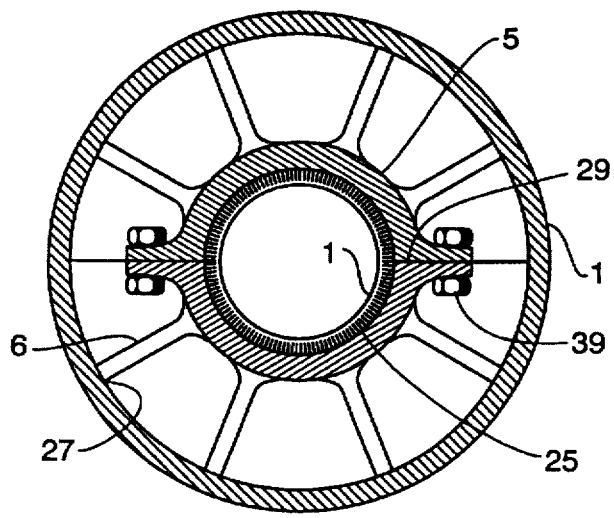
FIG. 7 is a cross section through the throat plane of the combustion chamber taken on line 12—12 of FIG. 2.

The throat support 5 is assembled around the coolant liner 3 as shown in FIG. 3E. For ease of assembly, the throat supports may be bolted 39 together as shown in FIG. 7. Then the coolant liner 3 along with the throat support sections 5 is installed in the structural jacket 1, as shown in FIG. 3F. To facilitate assembly, the structural jacket 1 may be heated and the coolant liner 3 and throat support sections 5 cooled to provide additional clearance between the parts during assembly.

Once the liner 3 and throat support 5 assembly is in place within the structural jacket 3G, the seal joints 31 and 33 (in FIG. 2) are made. The inlet and outlet manifolds are capped off for the bonding process. The internal voids created by the coolant passages, inlet and outlet manifolds, and between the throat support and the structural jacket are evacuated by a vacuum pump.

The entire assembly is then placed into a brazing furnace which is pressurized and brought up to bonding temperature. With the vacuum between the liner and the jacket and the external pressure on the outside of the jacket and liner, the parts are forced into intimate contact with each other. This intimate contact at temperature results in a flawless bond joint of the liner 3 to the structural jacket 1, the liner 3 to the throat supports 5, the throat supports 5 to the structural jacket 1, and the throat supports 5 to each other. Thus, the bond joint is completed for all the components in one bonding process. The entire structure is then cooled down. Once it's cooled down, the pressure is removed from the furnace. The bond is complete at this point. If needed, any excess material which was in the area of the seal joint 35, 37 can then be removed at this time.

The bonding process itself can take several different forms. The simplest of which is where the materials of the coolant liner 3 and the structural jacket 1 are held into intimate contact at temperature and pressure and form a diffusion bond. Another method utilizes materials that are plated onto the individual pieces prior to assembly and bonding. As an example, nickel plating can be applied to the structural jacket and gold plating applied to the coolant liner. These can be very thin amounts, in a range of 0.0005 inch or less. This combination of materials (nickel, gold, and the copper alloy liner), when brought up to temperature during the bonding process, form a liquidous metal or eutectic, which forms a liquid diffusion bond. The materials that are used for this type of bond joint are typically nickel and gold. However, other materials may also be plated, such as silver, depending on the materials used for the liner and the structural jacket. In another embodiment, braze alloy foil can be added between the gold and nickel plated pieces prior to assembly and prior to putting them into the bond furnace. The addition of the braze foil allows for a wider range of bonding process parameters. The added feature of using a braze alloy foil is that it flows and results in a more robust bond process.

FIG. 4 is a closeup view of 2—2 from FIG. 3. It shows the details of the aft end of the combustion chamber 10 featuring the seal joint 31 and the excess material from the seal joint 35, which may be removed following the bond process. The inlet manifold 7 is where the coolant enters the combustor assembly. The coolant then passes through the coolant inlet feed passages 13 and enters into the coolant channels 19. The high-velocity coolant provides a convective heat transfer mechanism to cool the hot gas wall 17 on coolant liner 3, therefore keeping the structural jacket 1 basically isolated from the hot combustion process.

Several joints are made during the single bond process: joint 23, between the coolant liner 3 and the structural jacket 1; joint 27, between the structural jacket 1 and the throat supports 5; and joint 25, between the coolant liner 3 and the throat supports 5.

FIG. 5 shows detail of view 4—4 of FIG. 2 featuring the forward end of the throat supports 5, the structural jacket 1, and coolant liner 3. The coolant liner 3 has bond joints 25 and 23 between the throat support 5 and structural jacket 1, respectively. Also shown is bond joint 27 between the throat support 5 and the outer structural jacket 1. All of the bond joints are completed during the same single-bond cycle previously discussed.

FIG. 6 shows a cross section through the coolant liner 3 and structural jacket 1 along line 8—8 of FIG. 4. It shows the detail of the coolant liner coolant channels 19 and the bond joint 23. The heat from the combustion process must be conducted through the hot gas wall 17 to the coolant and transferred away to keep the outer structural jacket 1 at a safe temperature below its structural limit. The coolant channels 19 are formed by the slots in the coolant liner 3 and the closeout formed by the structural jacket 1. The lands 21 in between the coolant channels 19 are integral with the hot gas wall 17. Since there is no joint between the hot gas wall 17 and the coolant in channels 19, the maximum heat transfer (fin effect) can take place providing the lowest temperature, the highest performance, and longest life chamber possible.

FIG. 7 is a section view along line 12—12 of FIG. 2 taken through the throat 41 of the combustion chamber assembly showing the coolant liner 3, the throat support sections 5 surrounding the liner 3 and the outer structural jacket 1. The pressure created by the combustion process is carried across the coolant liner 3 through the throat supports sections 5 to the outer structural jacket 1 by ribs 6 on the throat support sections. The bolts 39 are utilized to hold the throat support sections 5 around the liner 3 during the assembly prior to bonding. There is a bond joint 25 between the coolant liner 3 and the throat supports sections 5, a bond joint between the throat support sections themselves shown by 29, and a bond joint 27 between the throat support sections 5 and the outer structural jacket 1. All of the bond joints are created in one pressure bond process.

Figure 8:
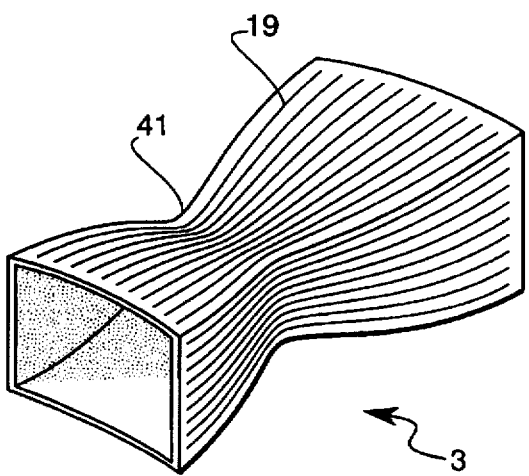
FIG. 8 shows an alternate geometry for a coolant liner shape.
Figure 9:
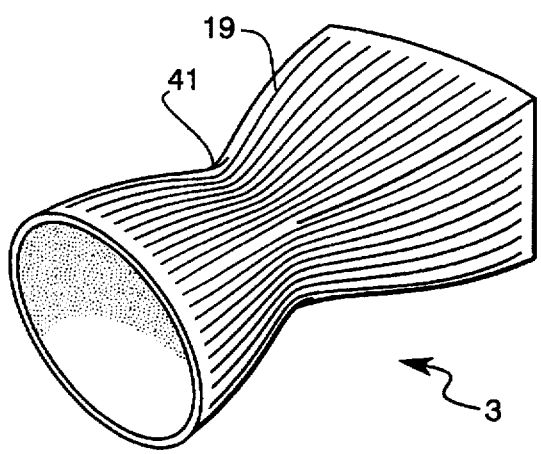
FIG. 9 shows second alternate geometry for a coolant liner shape.

FIGS. 8 and 9 show coolant liners 3 having alternate shapes. The same methods of making a combustion chamber can be used with these alternate shaped liners.

In another embodiment of the invention a liner which has been closed out by some method can also be slid into the structural jacket and bonded thereto as described herein.

Both the one piece liner and the one piece jacket manifold structure can be fabricated from several parts to form the one piece liner or one piece jacket manifold structure. The one piece liner is then inserted into the one piece manifold jacket structure and bonded as described herein.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A method of making a rocket engine combustion chamber comprising:

forming a coolant liner having an outside surface;

forming a plurality of coolant channels on the outside surface of the coolant liner so that the surface has a plurality of lands;

forming at least two throat support sections;

assembling the throat support sections together around the outside surface of the coolant liner;

forming a structural jacket having an inside cavity, an inlet manifold, inlet feed passages, an outlet manifold, and outlet feed passages;

inserting the coolant liner with surrounding throat support sections into the structural jacket inside cavity to form a combustion chamber assembly;

forming sealing joints between the coolant liner and the structural jacket to seal off the coolant channels;

capping the inlet and outlet manifolds;

inserting the combustion chamber assembly into a pressure furnace;

pressurizing the furnace, thus forcing the coolant liner, throat support sections, and structural jacket into contact;

heating the combustion chamber assembly to a bonding temperature for bonding the assembled parts to each other to form the combustion chamber while pressurizing the pressure furnace.

2. A method of making a rocket engine combustion chamber as in claim 1 further comprising the steps of:

evacuating the coolant passages and manifolds for lowering the pressure therein thus drawing the coolant liner, throat support sections and structural jacket into contact.

3. A method of making a rocket engine combustion chamber as in claim 1 further comprising the steps of:

cooling the combustion chamber in the furnace and removing the pressure from the furnace;

taking the combustion chamber out of the pressure furnace;

removing excess seal joint material;

removing the plugs.

4. A method of making a rocket engine combustion chamber as in claim 1 further comprising the steps of:

plating the coolant liner, throat support sections and structural jacket prior to bonding to form a better bond between the parts.

5. A method of making a rocket engine combustion chamber as in claim 4 further comprising the steps of:

inserting a braze alloy foil between the coolant liner, throat support sections and structural jacket prior to bonding to form a better bond between the parts.

6. A method of making a rocket engine combustion chamber as in claim 4 wherein:

nickel is plated to the structural jacket and gold is plated to the coolant liner.

7. A method of making a rocket engine combustion chamber as in claim 3 wherein:

nickel and gold are used for plating prior to bonding.

8. A method of making a rocket engine combustion chamber comprising:

forming a closed out coolant liner having an outside surface;

forming at least two throat support sections;

assembling the throat support sections together around the outside surface of the coolant liner;

forming a structural jacket having an inside cavity, an inlet manifold, inlet feed passages, an outlet manifold, and outlet feed passages;

inserting the coolant liner with surrounding throat support sections into the structural jacket inside cavity to form a combustion chamber assembly;

forming sealing joints between the coolant liner and the structural jacket to seal off the coolant channels;

capping the inlet and outlet manifolds;

inserting the combustion chamber assembly into a pressure furnace;

pressurizing the furnace, thus forcing the coolant liner, throat support sections, and structural jacket into contact;

heating the combustion chamber assembly to a bonding temperature for bonding the assembled parts to each other to form the combustion chamber while pressurizing the pressure furnace.

9. A method of making a rocket engine combustion chamber as in claim 8 further comprising the steps of:

evacuating the coolant passages and manifolds for lowering the pressure therein thus drawing the coolant liner, throat support sections and structural jacket into contact.

* * * * *